United States Patent
Wisniewski

(10) Patent No.: US 9,248,771 B2
(45) Date of Patent: Feb. 2, 2016

(54) DOORFRAME GANTRY LIFT SYSTEM

(71) Applicant: GM Global Technology Operations LLC, Detroit, MI (US)

(72) Inventor: Chet R. Wisniewski, Royal Oak, MI (US)

(73) Assignee: GM Global Technology Operations LLC, Detroit, MI (US)

(*) Notice: Subject to any disclaimer, the term of this patent is extended or adjusted under 35 U.S.C. 154(b) by 181 days.

(21) Appl. No.: 13/757,310

(22) Filed: Feb. 1, 2013

(65) Prior Publication Data

US 2014/0219757 A1    Aug. 7, 2014

(51) Int. Cl.
*B60P 1/64*    (2006.01)
*B60P 1/00*    (2006.01)
*B60P 1/36*    (2006.01)

(52) U.S. Cl.
CPC ... *B60P 1/00* (2013.01); *B60P 1/36* (2013.01); *B60P 1/6418* (2013.01); *B60P 1/6436* (2013.01)

(58) Field of Classification Search
CPC ............ B60P 1/00; B60P 1/36; B60P 1/56; B60P 1/64; B60P 1/6418; B60P 1/6436
USPC ................................... 414/541, 542
See application file for complete search history.

(56) References Cited

U.S. PATENT DOCUMENTS 2,736,602 A * 2/1956 Ault .................... 410/67
4,214,849 A * 7/1980 Downing ............. 414/545
5,007,793 A * 4/1991 Irvin .................... 414/502

* cited by examiner

*Primary Examiner* — Ernesto Suarez
*Assistant Examiner* — Ashley Romano
(74) *Attorney, Agent, or Firm* — BrooksGroup

(57) ABSTRACT

A number of variations of the invention may include a vehicle having a doorframe gantry lift system for raising and lowering a cargo module in the doorframe. A number of variations of the invention may include a cargo module having at least a first lift structure constructed and arranged to mate with a first lift structure of a vehicle doorframe gantry lift system.

17 Claims, 4 Drawing Sheets

DOORFRAME GANTRY LIFT SYSTEM

TECHNICAL FIELD

The field to which the disclosure generally relates to includes vehicles, cargo modules and methods of using the same.

BACKGROUND

There are many concerns related to the delivery of goods by vehicles in densely urbanized areas including the time to unload goods from the vehicle, security, ease of deployment and mobility, and parking violations due to manually sorting the cargo at the delivery site.

SUMMARY OF ILLUSTRATIVE VARIATIONS OF THE INVENTION

A number of variations of the invention may include a vehicle having a doorframe gantry lift system for raising and lowering a cargo module in the doorframe.

A number of variations of the invention may include a cargo module having at least a first lift structure constructed and arranged to mate with a first lift structure of a vehicle doorframe gantry lift system.

Other illustrative variations of the invention will become apparent from the detailed description provided hereinafter. It should be understood that the detailed description and specific examples, while disclosing optional variations of the invention, are intended for purposes of illustration only and are not intended to limit the scope of the invention.

BRIEF DESCRIPTION OF THE DRAWINGS

Select examples of variations of the invention will become more fully understood from the detailed description and the accompanying drawings, wherein.

DETAILED DESCRIPTION OF ILLUSTRATIVE VARIATIONS OF THE INVENTION

The following description of the variations is merely illustrative in nature and is in no way intended to limit the invention, its application, or uses.

Figure 1:
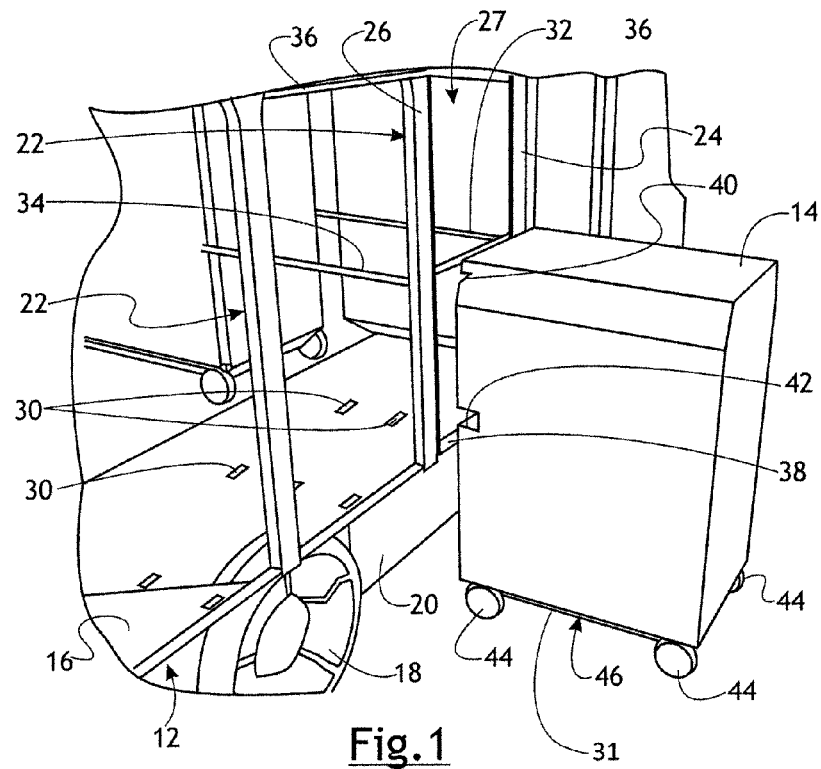
FIG. 1 is a perspective view illustrating a vehicle having a doorframe gantry lift system and a module to be lifted thereby onto a cargo bed of the vehicle according to a number of variations of the invention.
Figure 2:
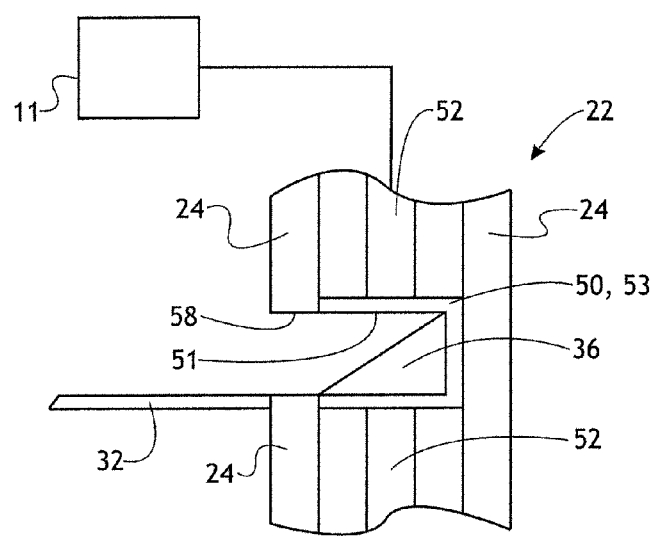
FIG. 2 is an enlarged view of a portion of a doorframe gantry lift system in a vehicle according to a number of variations of the invention.
Figure 3:
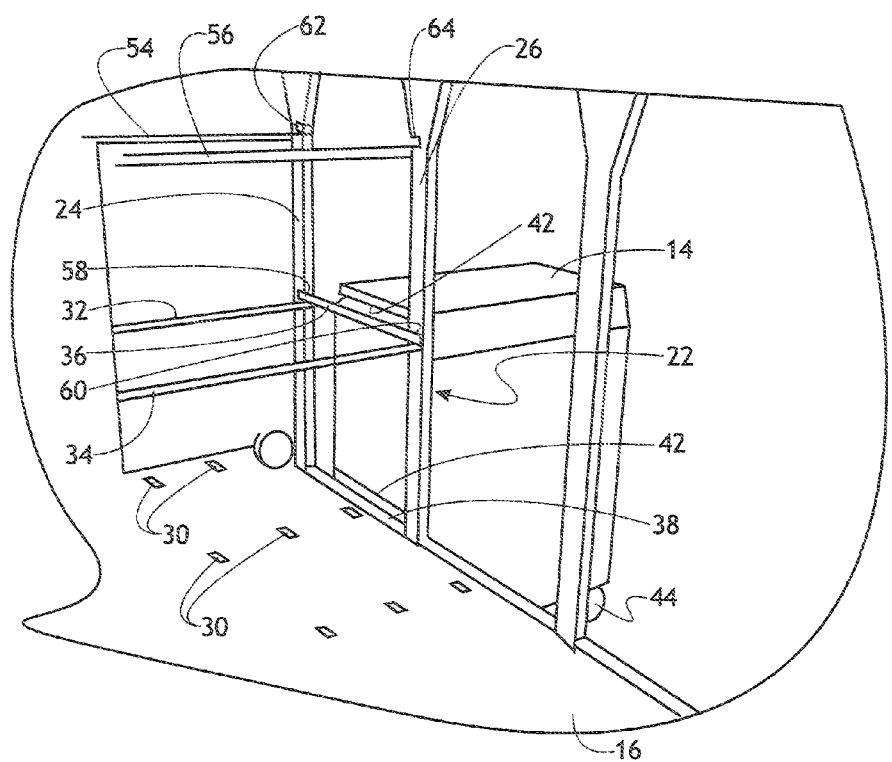
FIG. 3 is a perspective view of a vehicle having a doorframe Gantry lift system including horizontal slide rails for sliding the module over the vehicle cargo bed.

A number of variations of the invention are illustrated by FIG. 1-3 and may include a system or product 10 which may include a vehicle 12 and/or a cargo module 14. The vehicle 12 may include a cargo bed 16 supported on a frame (not shown closed parent and may include a plurality of wheels 18 and an energy source such as, but not limited to, electric battery 20 connect to a motor (not shown). The vehicle 12 may have a combustion engine, fuel cell stack, electrical motor and battery, or a hybrid system for propelling the vehicle 12. A doorframe gantry lift system 22 may be operatively positioned with respect to the vehicle bed 16 and may be constructed and arranged to raise and lower the cargo module 14 in a doorframe. The doorframe gantry lift system may include a first side frame 24 of a doorframe and a spaced apart second side frame 26 of the doorframe. The doorframe may include a header 28 (best seen in FIGS. 4-7) bridging the first side frame 24 and the spaced apart second side frame 26. The first side 24, second side 26, and the header 28 defined a doorway 27 through which the cargo module 14 may be passed and onto the cargo bed 16 of the vehicle 12. A plurality of recesses 30 may be provided in the vehicle bed 16 for mating with associated locking features 31 such as flexible pawls (not shown) which may extend from the bottom 46 of the cargo module 14 and may be constructed and arranged to selectively engage the shoulder of the cargo bed 16 defining the recess 30 in the cargo bed 16 to secure the cargo module 14 on the vehicle bed 16.

The vehicle 12 may also include a first lower rail 32 which may be connected to the first side 24 of the doorframe, and a spaced apart second lower rail 34 connected to the second side 26 of the doorframe. The vehicle may also include a first upper rail 54 connected to the first side 24 of the doorframe at a position above the first lower rail 32. The vehicle may also include a second upper rail 56 connected to the second side 26 of the doorframe at a position above the second lower rail 34. The first side 24 of the doorframe may include a first lower notch 58 which may be positioned above the first lower rail 32. Similarly, a second upper notch 62 may be formed in the first side 24 of the doorframe in a position above the first upper rail 54. A second lower notch 60 may be formed in the second side 26 of the doorframe a position above the second lower rail 34 and a second upper notch 64 may be formed in the second side frame at a position above the second upper rail 56. A first lift structure 36 may be provided, and in a number of variations may be a first lift bar. A second lift structure 42 may be provided, and in a number of variations may be a second lift bar. The first lift structure 36 and the second lift structure 42 may each be a separate piece from the module container 14 or the doorframe gantry lift system 22. In a number of other variations the first lift structure 36 and the second lift structure 42 may each be incorporated into one of the cargo module 14 or the doorframe gantry lift system 22. For example, each of the first lift structure 36 and second lift structure 42 may be a part of the cargo module 14 and may be constructed and arranged to be selectively extendable so as to provide lift rods extending from the sides of the cargo module 14 when the cargo module 14 is in a position to engage the doorframe gantry lift system 22.

The cargo module 14 may include a first mating lift structure 40 of the cargo module 14 for mating with the first lift structure 36. In a number of variations of the invention the first mating lift structure 40 may be a first recess formed in a side of the cargo module 14 and constructed and arranged to receive the first lift structure 36. The cargo module may also include a second mating lift structure 42 for mating with the second lift structure 42. In a number of variations of the invention the second mating lift structure 42 may be a second recess formed in a side of the cargo module 14 and constructed and arranged to receive the second lift structure 38.

A number of variations of the invention are illustrated by FIG. 2 and may include a doorframe gantry lift system 22 which may include a chain or cable 52 received in at least one of the first side 24 or second side 26 of the doorframe. The chain or cable may be connected to a motor or other power assist device 11 for moving the chain or cable 52 and a first and second direction, and to thereby lift the cargo module 14 to a position where the cargo module may be moved from the doorframe gantry lift system 22 over the vehicle cargo bed 16, and so that the cargo module 14 may be unloaded from the vehicle cargo bed 16 by moving the cargo module 14 from the cargo bed 16 onto the doorframe gantry lift system 22 and lowering the cargo module 14 to the ground.

A lift catch 50 may be connected to the chain or cable 52. In a number of variations, the lift catch 50 may have a recess 51 defined therein for receiving the first lift structure 36. The lift catch 50 may be constructed arrange so that the first lift structure 36 with the cargo module 14 connected thereto may be slid out of the lift catch 50 through one of the upper notches 62, 64 formed in the first side 24 and second side 26 of the doorframe, respectively, and onto upper rails 54, 56 when the cargo module 14 has been lifted by the doorframe gantry lift system 22 into an upper position where the cargo module 14 is over the vehicle bed 16. A second lift catch 53 may also be connected to the chain or cable 52 and may be similarly constructed as the first lift catch 50 to receive the second lift structure 38 therein and so that the second lift structure 38 having the cargo module 14 connected thereto may be slid through the lower notch 58, 60 formed in the first side 24 and second side 26 of the doorframe, respectively, and onto the lower rails 32, 34.

Figure 4:
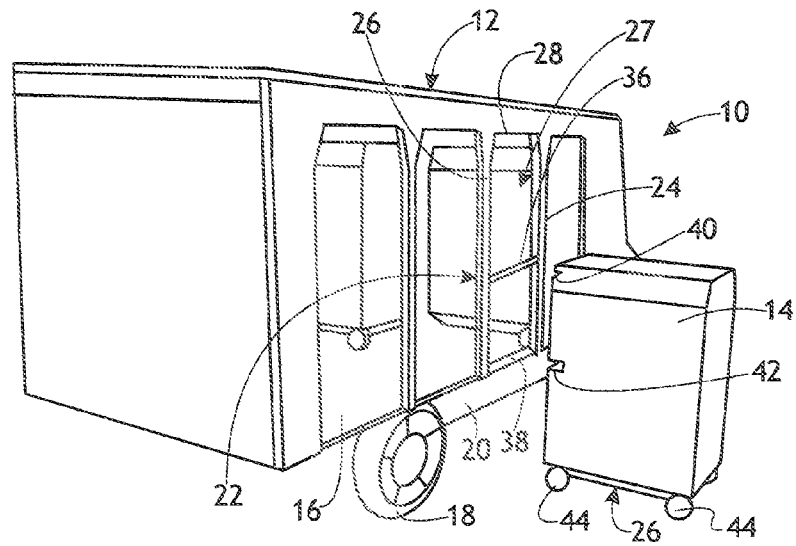
FIG. 4 is a perspective view of a vehicle with a doorframe gantry lift system in position to raise a cargo module from the ground or a platform next to the vehicle according to a number of variations of the invention.
Figure 5:
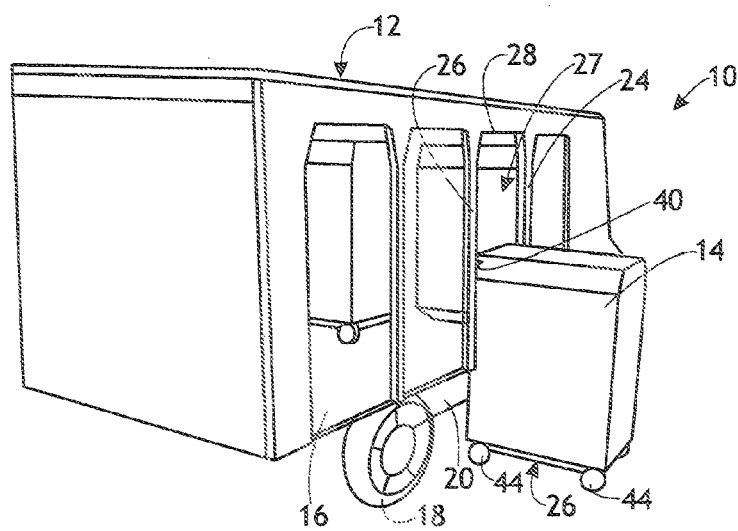
FIG. 5 is a perspective view illustrating a vehicle having a doorframe gantry lift system with a cargo module positions in the doorframe ready to be raised by the doorframe gantry lift system according to a number of variations of the invention.

A number of variations of the invention are illustrated in FIG. 4 and may include a vehicle 12 having the doorframe gantry lift system 22 position so that the first lift structure 36 is positioned to mated with the first mating lift structure 40 of the cargo module 14, and wherein the second lift structure 38 is positioned to mated with the second mating lift structure 42 of the cargo module 14. When the first lift structure 36 and second lift structure 38 are properly positioned, the cargo module 14 may be moved so that a portion is between the first side 24 and the second side 26 of the doorframe and so that the first lift structure 36 is mated with the second mating lift structure 42 on the cargo module 14 and the second lift structure 38 is mated with the second of structure 42 on the cargo module 14 as illustrated by FIG. 5.

Figure 6:
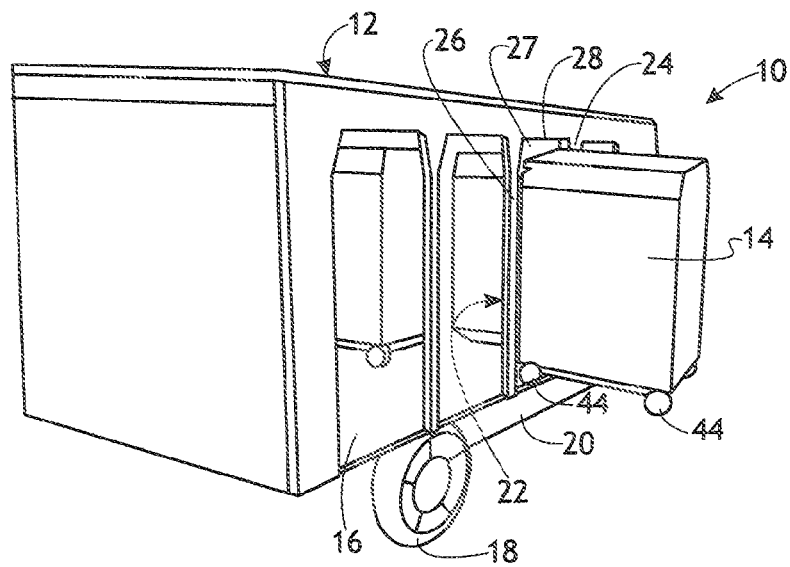
FIG. 6 is a perspective view illustrating a vehicle having a doorframe gantry lift system with a cargo module raised by the doorframe gantry lift system to a position where the cargo module is above a cargo bed of the vehicle according to a number of variations of the invention.
Figure 7:
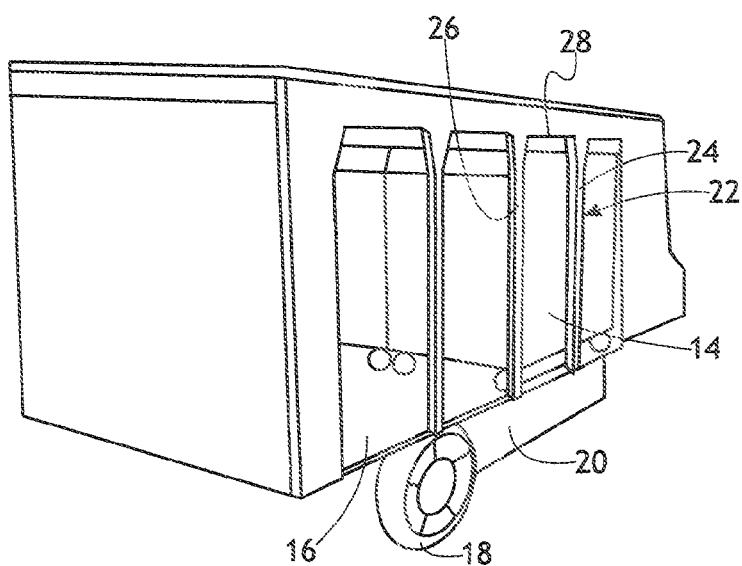
FIG. 7 illustrates a vehicle having a doorframe gantry lift system wherein the cargo module has been moved from the doorframe gantry lift system and onto a cargo bed of the vehicle according to a number of variations of the invention.

Referring now to FIG. 6, the doorframe gantry lift system 22 may be operated by moving the cable 52 so that the cargo module 14 is lifted in the doorframe to a position wherein the wheels 44 may rest on or are above the cargo bed 16. When so positioned, the cargo module 14 may be moved over the cargo bed 16 by an operator or by a powered assist system wherein the first lift structure 36 is slid across upper rails 54, 56 and the second lift structure 38 is slid across the lower rails 32, 34. The cargo module 14 may then be secured to the cargo bed 16 by any of a number of locking mechanisms known to those skilled in the art.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product comprising: a vehicle comprising a doorframe gantry lift system for raising and lowering a cargo module in the doorframe.

Variation 2 may include a product as set forth in Variation 1 wherein the doorframe gantry lift system comprises a doorframe including a first side frame and a spaced apart second side frame, and a chain or cable carried in at least one of the first side frame or second side frame, and at least one lift catch connected to the chain or cable constructed and arranged for mating with at least a first lift structure for raising and lowering the cargo module in the doorframe.

Variation 3 may include a product as set forth in any of Variations 1-2 wherein the at least one lift structure comprises a lift bar.

Variation 4 may include a product as set forth in any of Variations 1-3 wherein the vehicle further comprises at least a first rail connected to the first side frame and extending over a cargo bed of the vehicle, the first side frame having a first notch formed therein and a position above the first rail so that the at least one lift structure may be slid out of the lift catch through the first notch and onto the first rail so that the cargo module may be moved off of the doorframe gantry lift system and over the cargo bed of the vehicle.

Variation 5 may include a product as set forth in any of Variations 1-4 further comprising at least one locking feature in the vehicle bed for mating with a locking feature on the cargo module and securing the cargo module to the vehicle bed.

Variation 6 may include a product as set forth in any of Variations 1-5 further comprising a cargo module wherein the cargo module includes a first mating lift structure for mating with the first lift structure.

Variation 7 may include a product as set forth in any of Variations 1-6 wherein the cargo module includes a first recess formed in a side of the cargo module constructed and arranged to receive the first lift bar therein.

Variation 8 may include a product as set forth in any of Variations 1-7 further comprising a second lift structure.

Variation 9 may include a product as set forth in any of Variations 1-8 further comprising a cargo module including a second mating lift structure for mating with the second lift structure.

Variation 10 may include a product as set forth in any of Variations 1-9 wherein the second lift structure comprises a second lift bar.

Variation 11 may include a product as set forth in any of Variations 1-10 further comprising a second lift bar, and wherein the cargo module includes a second recess formed in the side of the cargo module constructed and arranged to receive the second lift bar therein.

Variation 12 may include a product as set forth in any of Variations 1-11 wherein the doorframe gantry lift system includes a second lift catch connected to the chain or cable, and wherein the second lift catch is constructed and arranged to receive the second lift bar therein.

Variation 13 may include a product as set forth in any of Variations 1-12 wherein the doorframe gantry the system comprises a doorframe including a first side frame and a spaced apart second side frame, and a chain or cable carried in at least one of the first side frame or second side frame, and at least one lift catch connected to the chain or cable constructed and arranged for mating with at least a first lift bar for raising and lowering the cargo module in the doorframe, the vehicle further comprising a cargo bed, and a first rail connected to the first side frame and extending over the cargo bed and a second rail connected to the second side frame and extending over the cargo bed, wherein the first side frame includes a first notch formed therein at a location above the first rail, and wherein the second side frame includes a second notch formed therein at a location above the second rail so that the lift bar may be slid out of the lift catch and onto the first rail and second rail so that the cargo container may be moved off of the doorframe gantry lift system and over the cargo bed.

Variation 14 may include a product as set forth in any of Variations 1-13 wherein the doorframe gantry the system comprises a doorframe including a first side frame and a spaced apart second side frame, and a chain or cable carried in at least one of the first side frame or second side frame, and a first lift catch connected to the chain or cable and constructed and arranged for mating with a first lift bar, a second lift catch connected to the chain or cable and constructed and arranged for mating with a second lift bar for raising and lowering the cargo module in the doorframe, the vehicle further comprising a cargo bed, and a first lower rail connected to the first side frame and extending over the cargo bed and a second lower rail connected to the second side frame and extending over the cargo bed, and a first upper rail connected to the first side frame and extending over the cargo bed and a second upper rail connected to the second side frame and extending over the cargo bed, wherein the first side frame includes a first notch formed therein at a location above the first lower side rail, and wherein each of the first side frame and the second side frame include a lower notch formed therein at locations above the first side rail and second lower rail, respectively, so that the second lift bar may be slid out of the second lift catch and onto the first lower rail and second lower rail, wherein each of the first side frame and the second side frame include an upper notch formed therein at locations above the first upper rail and the second rail, respectively, so that the first lift bar may be slid out of the first lift catch and onto the first upper rail and second upper rail and so that the cargo container may be moved off of the doorframe gantry lift system and over the cargo bed.

Variation 15 may include a product comprising a cargo module having at least a first lift structure constructed and arranged to mate with a first lift structure of a vehicle doorframe gantry lift system.

Variation 16 may include a product as set forth in Variation 15 wherein the at least a first lift structure comprises a recess formed in a side of the cargo module constructed and arranged to receive a first lift bar of the vehicle doorframe gantry lift system.

Variation 17 may include a product as set forth in any of Variations 15-16 wherein the cargo module further comprises a second recess formed in the side of the cargo module constructed and arranged to receive a second lift bar of the vehicle doorframe gantry system.

Variation 18 may include a method comprising: providing a vehicle comprising a cargo bed and a doorframe gantry lift system for raising and lowering a cargo module in the doorframe, wherein the doorframe gantry lift system is positioned adjacent the cargo bed and a cargo module, the cargo module having a bottom; lifting the cargo module to an elevated position using the doorframe gentry lift system so that the bottom cargo module is at or above the cargo bed.

Variation 19 may include a method as set forth in Variation 18 further comprising moving the cargo module from the doorframe gantry the system and over the cargo bed.

Variation 20 may include a a method as set forth in any of Variations 18-19 wherein the doorframe gantry lift system comprises a first side frame and a spaced apart second side frame, the vehicle further comprising at least one rail connected to one of the first side frame or second side frame, and wherein the moving the cargo module from the doorframe gantry lift system over the cargo bed comprises sliding the cargo module along the at least one rail.

Variation 21 may include a method comprising loading a cargo module into a vehicle using any of the products set forth in Variations 1-17.

The above description of select examples of the invention is merely exemplary in nature and, thus, variations or variants thereof are not to be regarded as a departure from the spirit and scope of the invention.

What is claimed is:

1. A product comprising:
a vehicle comprising a doorframe gantry lift system for raising and lowering a cargo module in the doorframe wherein the doorframe gantry lift system comprises a doorframe including a first side frame and a spaced apart second side frame, and a chain or cable carried in at least one of the first side frame or second side frame, and at least one lift catch connected to the chain or cable constructed and arranged for mating with at least a first lift structure comprising a lift bar for raising and lowering. the cargo module in the doorframe wherein a first rail is connected to the first side frame and extends over a cargo bed of the vehicle, the first side frame having a first notch formed therein at a position above the first rail so that the at least one lift structure may be slid out of the lift catch through the first notch and onto the first rail so that the cargo module may be moved off of the doorframe gantry lift system and over the cargo bed of the vehicle.

2. A product as set forth in claim 1 further comprising at least one recess in the vehicle bed for mating with a locking feature on the cargo module and securing the cargo module to the vehicle bed.

3. A product as set forth in claim 1 further comprising a cargo module wherein the cargo module includes a first mating lift structure for mating with the first lift structure.

4. A product as set forth in claim 1 wherein the cargo module includes a first recess formed in a side of the cargo module constructed and arranged to receive the lift bar therein.

5. A product as set forth in claim 1 further comprising a second lift structure.

6. A product as set forth in claim 5 further comprising a cargo module including a second mating lift structure for mating with the second lift structure.

7. A product as set forth in claim 5 wherein the second lift structure comprises a second lift bar.

8. A product as set forth in claim 4 further comprising a second lift bar, and wherein the cargo module includes a second recess framed in the side of the cargo module constructed and arranged to receive the second lift bar therein.

9. A product as set forth in claim 8 wherein the doorframe gantry lift system includes a second lift catch connected to the chain or cable, and wherein the second lift catch is constructed and arranged to receive the second lift bar therein.

10. A product as set forth in claim 1 wherein the doorframe gantry lift system comprises a doorframe including a first side frame and a spaced apart second side frame, and a chain or cable carried in at least one of the first side frame or second side frame, and at least one lift catch connected to the chain or cable constructed and arranged for mating with at least a first lift bar for raising and lowering the cargo module in the doorframe, the vehicle further comprising a cargo bed, and a first rail connected to the first side frame and extending over the cargo bed and a second rail connected to the second side frame and extending over the cargo bed, wherein the first side frame includes a first notch formed therein at a location above the first rail, and wherein the second side frame includes a second notch formed therein at a location above the second rail so that the lift bar may be slid out of the lift catch and onto the first rail and second rail so that the cargo container may be moved off of the doorframe gantry lift system and over the cargo bed.

11. A product as set forth in claim 1 wherein the doorframe gantry lift system comprises a doorframe including a first side frame and a spaced apart second side frame, and a chain or cable carried in at least one of the first side frame or second side frame, and a first lift catch connected to the chain or cable and constructed and arranged for mating with a first lift bar, a second lift catch connected to the chain or cable and constructed and arranged for mating with a second lift bar for raising and lowering the cargo module in the doorframe, the vehicle further comprising a cargo bed, and a first lower rail connected to the first side frame and extending over the cargo bed and a second lower rail connected to the second side frame and extending over the cargo bed, and a first upper rail connected to the first side frame and extending over the cargo bed and a second upper rail connected to the second side frame and extending over the cargo bed, wherein the first side frame includes a first notch formed therein at a location above the first lower side rail, and wherein each of the first side frame and the second side frame include a lower notch formed therein at locations above the first side rail and second lower rail, respectively, so that the second lift bar may be slid out of the second lift catch and onto the first lower rail and second lower rail, wherein each of the first side frame and the second side frame include an upper notch formed therein at a locations above the first upper rail and the second rail, respectively, so that the first lift bar may be slid out of the first lift catch and onto the first upper rail and second upper rail and so that the cargo container may be moved off of the doorframe gantry lift system and over the cargo bed.

12. A product comprising a cargo module having at least a first lift structure constructed and arranged to mate with a second lift structure of a vehicle doorframe gantry lift system comprising a doorframe including a first side frame and a spaced apart second side frame, and a chain or cable carried in at least one of the first side frame or second side frame, and at least one lift catch connected to the chain or cable constructed and arranged for mating with at least the first lift structure for raising and lowering the cargo module in the doorframe wherein a first rail is connected to the first side frame and extends over a cargo bed of the vehicle, the first side frame having a first notch formed therein at a position above the first rail so that the at least one lift structure may be slid out of the lift catch through the first notch and onto the first rail so that the cargo module may be moved off of the doorframe gantry lift system and over the cargo bed of the vehicle.

13. A product as set forth in claim 12 wherein the at least first lift structure comprises a recess formed in a side of the cargo module constructed and arranged to receive a first lift bar of the second lift structure of the vehicle doorframe gantry lift system.

14. A product as set forth in claim 13 wherein the cargo module further comprises a second recess formed in the side of the cargo module constructed and arranged to receive a second lift bar of the vehicle doorframe gantry system.

15. A method comprising:
providing a vehicle comprising a cargo bed and a doorframe gantry lift system for raising and lowering a cargo module in a doorframe, wherein the doorframe gantry lift system is positioned adjacent the cargo bed and a cargo module, the cargo module having a bottom, wherein the doorframe gantry lift system comprises a first side frame and a spaced apart second side frame, and a chain or cable carried in at least one of the first side frame or second side frame, and at least one lift catch connected to the chain or cable constructed and arranged for mating with at least a first lift structure comprising a lift bar for raising and lowering the cargo module in the doorframe wherein at least one rail is connected to one of the first side frame or second side frame and extends over a cargo bed of the vehicle, the first side frame having a first notch formed therein at a position above the first rail so that the at least one lift structure may be slid out of the lift catch through the first notch and onto the first rail so that the cargo module may be moved off of the doorframe gantry lift system and over the cargo bed of the vehicle;
lifting the cargo module to an elevated position using the doorframe gentry lift system so that the bottom cargo module is at or above the cargo bed.

16. A method as set forth in claim 15 further comprising moving the cargo module from the doorframe gantry the system and over the cargo bed.

17. A method as set forth in claim 16 wherein the moving the cargo module from the doorframe gantry lift system over the cargo bed comprises sliding the cargo module along the at least one rail.

* * * * *